Aug. 11, 1959  N. E. TESTO  2,898,970
TELESCOPING TUBULAR EXPANDER AND CYLINDRICAL PILOT FOR
EXPANDING METAL TUBING IN SITU WHEN END OF TUBING
IS CLAMPED AROUND INSERTED PILOT
Filed July 29, 1957
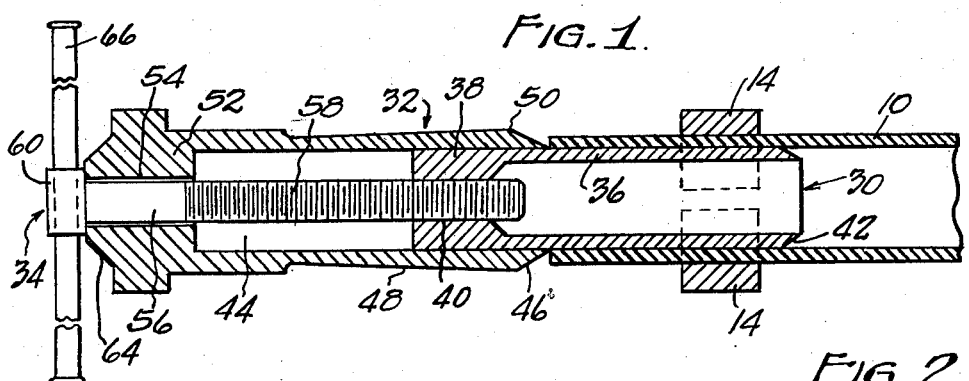
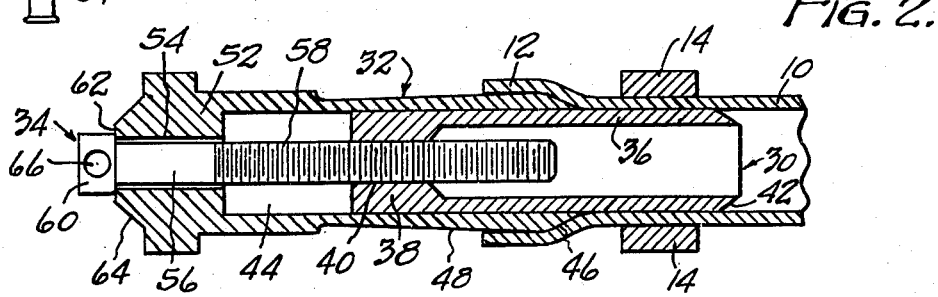
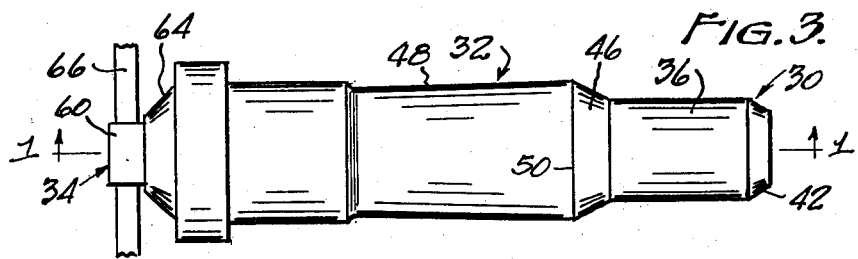
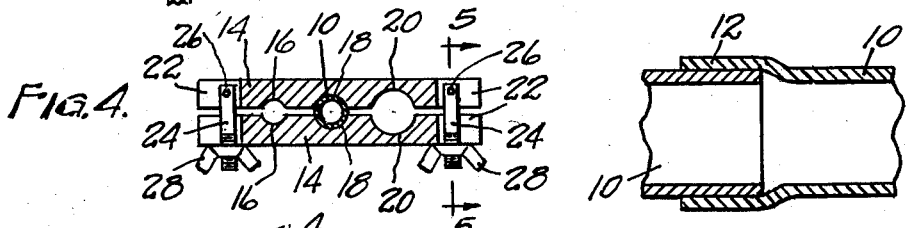
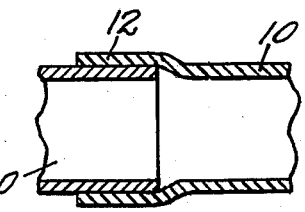
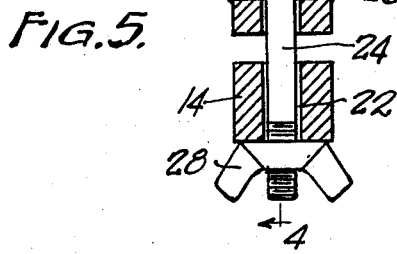
INVENTOR.
NATE E. TESTO
BY
Eugene C. Knublock
ATTORNEY.

United States Patent Office 2,898,970
Patented Aug. 11, 1959

2,898,970

TELESCOPING TUBULAR EXPANDER AND CY-LINDRICAL PILOT FOR EXPANDING METAL TUBING IN SITU WHEN END OF TUBING IS CLAMPED AROUND INSERTED PILOT

Nate E. Testo, Elkhart, Ind.

Application July 29, 1957, Serial No. 674,670

5 Claims. (Cl. 153—80.5)

This invention relates to a screw feed device for expanding metal tubing in situ, and more particularly to a device for expanding or flaring non-ferrous tubing, such as copper and brass tubing.

In the installation of copper and brass tubing in plumbing systems and like installations, the sections of pipe are joined by swaging one end of a tube and fitting the end of the adjacent tube into the swaged or expanded end and then brazing or soldering the joint. It is frequently necessary to perform the expanding operation after a pipe has been installed in place and, therefore, the purpose must be served in inconvenient locations. At the present time this operation is done by the use of a tapered swage introduced into the mouth of the tube and then hammered to produce the expansion desired. If the swage so hammered is not accurately aligned, the hammering produces an irregular or oval flared portion. It will be obvious that the hammering is difficult in certain locations, and also it is apparent that, if the tubing being hammered has been mounted in hangers or mounting means, it may be released therefrom incident to the hammering operation.

It is the primary object of this invention to provide a tool which will eliminate the need for hammering in order to produce tube expansion and which will produce a uniform circular centered expanded shape necessary to produce a good and tight sealed, soldered, sweated or brazed joint.

A further object is to provide a device of this character which is light in weight, easy to apply in out-of-the-way locations, which does not require much space for its manipulation, and which does not require particular skill or training for its use.

Other objects will be apparent from the following specification.

In the drawing:

Fig. 1 is an axial sectional view of the device taken on line 1—1 of Fig. 3, and illustrating one step in the use of the tool;

Fig. 2 is a sectional view illustrating another step in the use of the tool;

Fig. 3 is a side view of the tool;

Fig. 4 is a view of a clamp as seen on line 4—4 of Fig. 5;

Fig. 5 is a sectional view of the clamp taken on line 5—5 of Fig. 4; and

Fig. 6 is an axial sectional view of a pipe joint formed by the flared tube produced by this tool.

Referring to the drawing which illustrates the preferred embodiment of the invention, the numeral 10 designates a non-ferrous pipe which is to be expanded at one end 12 thereof to such an extent that the inner diameter at the expanded part will be slightly greater than the outer diameter of the remainder of the pipe, so as to receive the end of an adjacent pipe in the manner illustrated in Fig. 6. The parts so interfitted are joined together by soldering, brazing or other means to form a joint between adjacent pipe or tube sections.

In performing this expanding function, I employ a tool of the character illustrated in Fig. 3 in conjunction with a clamp which may be of the character illustrated in Figs. 4 and 5. The clamp may be of any type found suitable, and in the form shown consists of a pair of clamping bars 14, each provided with a plurality of notches or grooves 16, 18 and 20 of different sizes in its inner face and in register with like notches in the other so as to grip at a selected pair thereof a pipe 10, as illustrated in Fig. 4. The ends of the bars are preferably notched at 22, and one of the bars 14 has pivoted in each notch thereof the shank 24 of a bolt, which shank is pivoted by means of a pivot pin 26. The screw-threaded shanks 24 mount thumb nuts 28 or other suitable securing means which can be operated to draw the clamp jaws 14 together for effectively clamping a pipe 10 therebetween, in the manner illustrated in Fig. 4 and well understood in the art. The clamp easily fits upon the pipe and is quickly released therefrom by manipulating the thumb nuts 28, as will be evident.

The expander consists of three parts in the nature of a pilot member 30, an expander member 32, and an actuator 34.

The pilot member 30 consists of a tubular part 36 having an end wall 38 provided with a screw-threaded axial bore 40. The leading end of the pilot is preferably of frusto conical or tapered configuration at 42. The outer diameter of the pilot 36 is slightly less than the diameter of the bore of tube 10 so as to accommodate a snug slide fit thereof within the bore of the tube 10 i.e., a fit with sliding clearance. The frusto conical end 42 guides the insertion of the pilot in the tube.

The expander 32 consists of a generally tubular body having an axial bore 44 extending for the major portion of the length thereof and of a diameter to snugly and slidably receive and guide the pilot member 30 therein. The leading end of the expander has a frusto conical edge 46 terminating in a sharp circular or pointed edge of a diameter greater than the diameter of pilot 36 and not greater than the normal inner diameter of the tube 10, so as to accommodate starting thereof within the tube 10. The portion of the expander rearwardly of the frusto conical portion 46 is tapered reversely at 48 so that the wall thickness of the expander progressively decreases from a circumferential ridge 50 to a point spaced a distance at least equal to the length of the maximum flare 12 to be provided upon the pipe 10. An end wall 52 spans the end of the expander opposite the frusto conical end 46 thereof and the same has an axial bore 54 therethrough whose diameter is greater than the diameter of the screw-threaded bore 40 in the pilot 30.

The actuator 34 comprises an elongated shaft 56 of a diameter slightly less than the diameter of the bore 54 which passes freely through said bore and which is screw-threaded at 58 for the major portion of its length and is threaded in the aperture 40 of pilot 30. The shank 56 has a head 60 mounted thereon and extending transversely thereof to bear against the end surface 62 of the expander 32 opposite the frusto conical end 46 thereof. The end surface 62 may be of small area as determined by a frusto conical configuration 64 of the expander, thereby insuring that the frictional resistance to the actuator encountered by contact of the head 60 with the surface 62 will be held at a minimum. A cross-pin 66 is carried by the head 60 and is of sufficient length to provide adequate leverage to turn the actuator by hand.

In the use of the device, the pilot 30 is extended relative to the expander 32 to the position as illustrated in Fig. 1, wherein the end of the threaded shank 58 engages the threads of bore 40 of the head 38. In this position the pilot 30 extends or projects substantially beyond the frusto conical end 46 of the expander 32. The pilot 30 is introduced into the tube 10 to the extent permitted by contact of the frusto conical tip 46 of the expander 32 with the end of the tube 10. The clamp 14 is then applied around the tube 10 to embrace the tube and pilot at a point spaced from the end of the tube a distance greater than the length of the flare 12 which is desired and at a point which is reinforced by the pilot 30, so as to lock said tube and pilot against relative movement all as illustrated in Fig. 1.

The clamp 14 is then held by the hand of the user and the actuator 34 is gripped in the other hand and turned for the purpose of advancing the screw-threaded shank 58 relative to the pilot 30, thereby forcing the expander against the end of the tube 10. Continued rotation of the actuator 34 forces the frusto conical leading end 46 of the expander 32 into the tube 10, thus expanding the same until the mouth is stretched to the diameter of the annular crest 50. Continued rotation of the shaft 58 thereafter advances the expander into the tube to produce the flared portion 12 of desired length. Inasmuch as the expander body 32 is reversely tapered at 48, the flared part 12 of the tube has clearance therewith, and the resistance encountered during the operation remains uniform after the maximum flaring of the tube to pass over the annular ridge 50 occurs. In other words, there is no danger of binding of the flared tube part 12 upon the body of the expander, and contact between the tube and the expander is limited substantially to the area of the frusto conical surface 46 at all times.

After the flared portion 12 has been fully formed, the clamp 14 is released. Rotation of the actuator 34 is then continued in the same direction which produced the expansion of the tube end at 12. This rotation shifts the parts 30, 32 toward fully retracted position. In this instance, however, the flared end 46 of the expander seats at the shoulder between the flared end 12 of the tube and the body of the tube which provides an abutment so that retraction of parts 30, 32 withdraws the pilot 30 from the end of the tube 10. After the pilot is retracted fully the frictional contact of the device with the tube is limited to that existing between the expander 32 and the flared part of the tube. Since the contact of the expander with the expanded tube is limited to the area of the frusto conical surface 46, it will be apparent that the tool may then be pulled out of the tube easily.

While the preferred embodiment of the invention has been illustrated and described, it will be understood that changes in the construction may be made within the scope of the appended claims without departing from the spirit of the invention.

I claim:

1. A device for expanding a metal tube, comprising a cylindrical pilot having a snug sliding fit in said tube, a clamp gripping said tube at a part thereof spaced from its end and embracing said tube and pilot to lock said tube and pilot against relative movement, a tubular expander telescopically receiving said pilot, said expander having a frusto conical pipe-flaring end, and means for advancing said expander on said pilot.

2. A device for expanding a metal tube, comprising a cylindrical pilot having a snug sliding fit in said tube, a clamp gripping said tube at a part thereof spaced from its end and embracing said tube and pilot to lock said tube and pilot against relative movement, a tubular expander telescopically receiving said pilot, said expander having a frusto conical pipe-flaring end, and means for advancing said expander on said pilot, said tubular expander having a portion adjacent said frusto conical end which is tapered in the opposite direction from the frusto conical end.

3. A device for expanding a metal tube, comprising a cylindrical pilot having a snug sliding fit in said tube, a clamp gripping said tube at a part thereof spaced from its end and embracing said tube and pilot to lock said tube and pilot against relative movement, a tubular expander telescopically receiving said pilot, said expander having a frusto conical pipe-flaring end, and means for advancing said expander on said pilot, said tubular expander having a reduced diameter outer surface portion rearwardly of said frusto conical end thereof, said expander having a circumferential ridge at the large diameter of said frusto conical end and surface portion.

4. A device for expanding a metal tube, comprising a cylindrical pilot having a snug sliding fit in said tube, a clamp gripping said tube at a part thereof spaced from its end and embracing said tube and pilot to lock said pilot against endwise movement in said tube, a tubular expander telescopically receiving said pilot, said expander having a frusto conical pipe-flaring end and an actuator for advancing said expander including a shaft rotatable relative to said expander and screw-threaded in said pilot and having a head abutting the end of said expander.

5. A device for expanding a metal tube, comprising a cylindrical pilot having a snug sliding fit in said tube, a clamp gripping said tube at a part thereof spaced from its end and embracing said tube and pilot to lock said pilot against endwise movement in said tube, a tubular expander telescopically receiving said pilot, said expander having a frusto conical pipe-flaring end and an opposite end having an axial bore smaller than the diameter of said pilot, said pilot having a screw-threaded axial bore at one end, a shaft rotatable in said expander bore and threaded in said pilot bore, and a head on said shaft abutting the end of said expander and including a hand grip portion.

References Cited in the file of this patent

UNITED STATES PATENTS

| | | |
|---|---|---|
| 389,441 | Callahan | Sept. 11, 1888 |
| 1,746,280 | Quint | Feb. 11, 1930 |
| 2,303,061 | Parker | Nov. 24, 1942 |
| 2,365,834 | Olmsted | Dec. 26, 1944 |
| 2,377,406 | Dedrick | June 5, 1945 |
| 2,493,127 | Franck | Jan. 3, 1950 |
| 2,562,419 | Ferris | July 31, 1951 |
| 2,614,318 | McCord | Oct. 21, 1952 |
| 2,780,272 | Ammon | Feb. 5, 1957 |